United States Patent
Hejazi et al.

(10) Patent No.: US 10,841,806 B2
(45) Date of Patent: *Nov. 17, 2020

(54) METHOD AND SYSTEM FOR SOFT FREQUENCY REUSE IN A DISTRIBUTED ANTENNA SYSTEM

(71) Applicant: DALI WIRELESS, INC., Menlo Park, CA (US)

(72) Inventors: Seyed Amin Hejazi, Burnaby (CA); Shawn Patrick Stapleton, Vancouver (CA)

(73) Assignee: DALI WIRELESS, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/424,102

(22) Filed: May 28, 2019

(65) Prior Publication Data
US 2020/0137582 A1 Apr. 30, 2020

Related U.S. Application Data

(63) Continuation of application No. 15/912,859, filed on Mar. 6, 2018, now Pat. No. 10,506,442, which is a
(Continued)

(51) Int. Cl.
*H04W 16/10* (2009.01)
*H04L 5/00* (2006.01)
(Continued)

(52) U.S. Cl.
CPC ............... *H04W 16/10* (2013.01); *H04L 1/00* (2013.01); *H04L 5/0023* (2013.01);
(Continued)

(58) Field of Classification Search
CPC . H04W 16/10; H04W 72/0453; H04W 52/04; H04W 88/085; H04W 72/04;
(Continued)

(56) References Cited

U.S. PATENT DOCUMENTS 7,403,500 B2 * 7/2008 King et al. .................... 370/328
9,197,358 B2 11/2015 Hejazi et al.
(Continued)

OTHER PUBLICATIONS

Office Action for U.S. Appl. No. 13/894,309, dated Dec. 31, 2014.
(Continued)

*Primary Examiner* — Dady Chery
(74) *Attorney, Agent, or Firm* — Artegis Law Group, LLP

(57) ABSTRACT

A method for routing and switching operator RF signals includes providing one or more Digital Remote Units (DRUs) and providing at least one Digital Access Unit (DAU) configured to communicate with at least one of the one or more DRUs. A first DRU is operable to communicate using a first set of frequencies characterized by a first frequency band over a first geographic footprint and a second set of frequencies characterized by a second frequency band different from the first frequency band over a second geographic footprint including and surrounding the first geographic footprint. A second DRU is operable to communicate using the first set of frequencies over a third geographical footprint and a third set of frequencies characterized by a third frequency band different from the first frequency band and the second frequency band over a fourth geographic footprint including and surrounding the third geographic footprint.

20 Claims, 9 Drawing Sheets

Related U.S. Application Data continuation of application No. 15/383,431, filed on Dec. 19, 2016, now Pat. No. 9,942,771, which is a continuation of application No. 14/887,922, filed on Oct. 20, 2015, now Pat. No. 9,538,536, which is a continuation of application No. 13/894,309, filed on May 14, 2013, now Pat. No. 9,197,358.

(60) Provisional application No. 61/649,143, filed on May 18, 2012.

(51) Int. Cl.
| | | |
|---|---|---|
| *H04L 1/00* | (2006.01) | |
| *H04W 52/04* | (2009.01) | |
| *H04W 72/04* | (2009.01) | |
| *H04J 11/00* | (2006.01) | |
| *H04W 28/06* | (2009.01) | |
| *H04W 88/08* | (2009.01) | |

(52) U.S. Cl.
CPC ....... *H04W 52/04* (2013.01); *H04W 72/0453* (2013.01); *H04J 11/0023* (2013.01); *H04L 2001/0093* (2013.01); *H04W 28/06* (2013.01); *H04W 72/04* (2013.01); *H04W 88/085* (2013.01)

(58) Field of Classification Search
CPC ........ H04W 28/06; H04L 5/0023; H04L 1/00; H04L 2001/0093; H04J 11/0023
See application file for complete search history.

(56) References Cited

U.S. PATENT DOCUMENTS

| | | | |
|---|---|---|---|
| 9,538,536 | B2 | 1/2017 | Hejazi et al. |
| 9,942,771 | B2 | 4/2018 | Hejazi et al. |
| 10,506,442 | B2 | 12/2019 | Hejazi et al. |
| 2002/0106003 | A1 | 8/2002 | Schilling |
| 2003/0054762 | A1* | 3/2003 | Karabinis .............. 455/12.1 |
| 2005/0064813 | A1* | 3/2005 | Karabinis .............. 455/13.2 |
| 2005/0239403 | A1* | 10/2005 | Karabinis .............. 455/12.1 |
| 2011/0135308 | A1 | 6/2011 | Tarlazzi et al. |
| 2014/0233468 | A1 | 8/2014 | Hejazi et al. |
| 2016/0113014 | A1 | 4/2016 | Hejazi et al. |

OTHER PUBLICATIONS

Notice of Allowance for U.S. Appl. No. 13/894,309, dated Jul. 17, 2015.
Office Action for U.S. Appl. No. 14/887,922 dated Feb. 26, 2016.
Notice of Allowance for U.S. Appl. No. 14/887,922 dated Aug. 26, 2016.
Office Action for U.S. Appl. No. 15/383,431 dated Jun. 5, 2017.
Notice of Allowance for U.S. Appl. No. 15/383,431 dated Dec. 6, 2017.
Office Action for U.S. Appl. No. 15/912,859 dated Aug. 27, 2018.
Notice of Allowance for U.S. Appl. No. 15/912,859 dated Feb. 27, 2019.
Notice of Allowance for U.S. Appl. No. 15/912,859 dated Jul. 25, 2019.

* cited by examiner

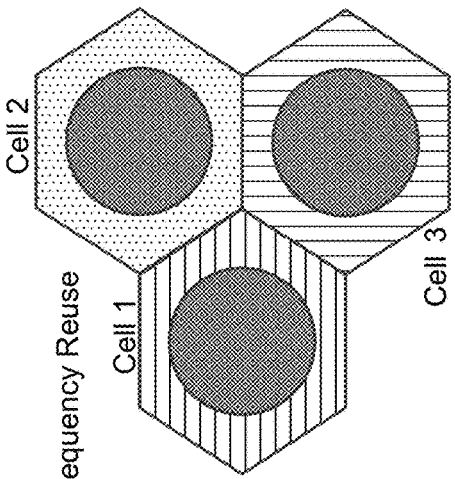
FIG. 1A
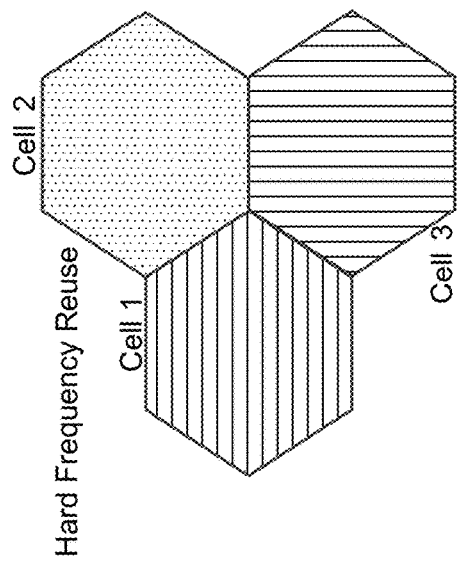
FIG. 1B
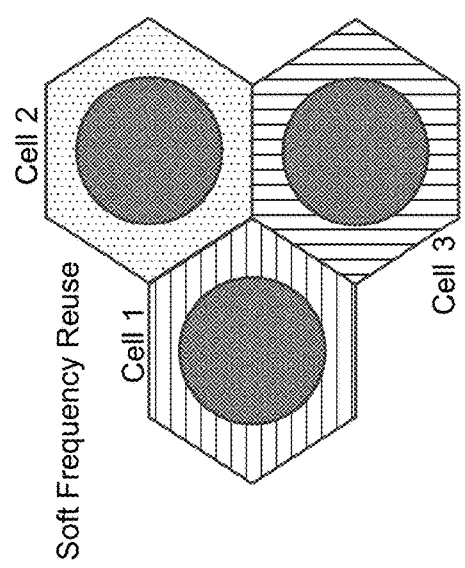
FIG. 1C
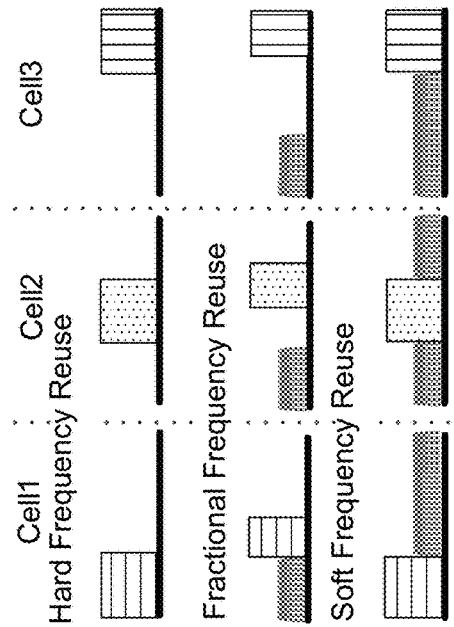
FIG. 1D
FIG. 1E
FIG. 1F

METHOD AND SYSTEM FOR SOFT FREQUENCY REUSE IN A DISTRIBUTED ANTENNA SYSTEM

CROSS-REFERENCES TO RELATED APPLICATIONS

This application is a continuation of U.S. patent application Ser. No. 15/912,859, filed Mar. 6, 2018; which is a continuation of U.S. patent application Ser. No. 15/383,431, filed Dec. 19, 2016, now U.S. Pat. No. 9,942,771; which is a continuation of U.S. patent application Ser. No. 14/887,922, filed Oct. 20, 2015, now U.S. Pat. No. 9,538,536; which is a continuation of U.S. patent application Ser. No. 13/894,309, filed May 14, 2013, now U.S. Pat. No. 9,197,358; which claims priority to U.S. Provisional Patent Application No. 61/649,143, filed on May 18, 2012, entitled "Method and System for Soft Frequency Reuse in a Distributed Antenna System", the disclosures of which are hereby incorporated by reference in their entireties for all purposes.

BACKGROUND OF THE INVENTION

Wireless communication systems employing Distributed Antenna Systems (DAS) are available. A DAS typically includes one or more host units, optical fiber cable or other suitable transport infrastructure, and multiple remote antenna units. A radio base station is often employed at the host unit location commonly known as a base station hotel, and the DAS provides a means for distribution of the base station's downlink and uplink signals among multiple remote antenna units. The DAS architecture with routing of signals to and from remote antenna units can be either fixed or reconfigurable.

A DAS is advantageous from a signal strength and throughput perspective because its remote antenna units are physically close to wireless subscribers. The benefits of a DAS include reducing average downlink transmit power and reducing average uplink transmit power, as well as enhancing quality of service and data throughput.

Despite the progress made in wireless communications systems, a need exists for improved methods and systems related to wireless communications.

SUMMARY OF THE INVENTION

The present invention generally relates to wireless communication systems employing Distributed Antenna Systems (DAS) as part of a distributed wireless network. More specifically, the present invention relates to a DAS utilizing Soft Frequency Reuse or Fractional Frequency Reuse techniques. In a particular embodiment, the present invention has been applied to the reuse of communications frequencies in central portions of adjacent DAS cells, improving system data rates and performance. The methods and systems described herein are applicable to a variety of communications systems including systems utilizing various communications standards.

According to an embodiment of the present invention, a method for routing and switching operator RF signals is provided. The method includes providing one or more Digital Remote Units (DRUs), each configured to receive one or more downlink radio frequencies, and to transmit one or more uplink radio frequencies, and providing at least one Digital Access Unit (DAU) configured to communicate with at least one of the one or more DRUs. A first DRU in a first cell is operable to communicate using a first set of frequencies characterized by a first frequency band over a first geographic footprint and a second set of frequencies characterized by a second frequency band different from the first frequency band over a second geographic footprint including and surrounding the first geographic footprint. A second DRU in a second cell is operable to communicate using the first set of frequencies over a third geographical footprint and a third set of frequencies characterized by a third frequency band different from the first frequency band and the second frequency band over a fourth geographic footprint including and surrounding the third geographic footprint.

According to another embodiment of the present invention, a method of distributing communications frequencies is provided. The method includes providing a set of communications units and transmitting and receiving, from a first communications unit of the set of communications units, a first set of frequencies characterized by a first frequency band and a first geographic footprint and a second set of frequencies characterized by a second frequency band different from the first frequency band and a second geographic footprint larger than and at least partially surrounding the first geographic footprint. The method also includes transmitting, and receiving, from a second communications unit of the set of communications units, a third set of frequencies including one or more frequencies in the first frequency band and a third geographical footprint and a fourth set of frequencies including one or more frequencies in a third frequency band and a fourth geographical footprint larger than and at least partially surrounding the third geographical footprint.

According to a specific embodiment of the present invention, a communications system is provided. The communications system includes a host unit and a first communications unit coupled to the host unit and operable to transmit and receive communications using a first set of frequencies in a first frequency range and associated with a first geographical footprint and a second set of frequencies in a second frequency range and associated with a second geographical footprint larger than the first geographical footprint. The communications system also includes a second communications unit coupled to the host unit and operable to transmit and receive communications using one or more of the first set of frequencies in a region associated with a third geographical footprint and a third set of frequencies in a third frequency range and associated with a fourth geographical footprint larger than the third geographical footprint.

According to an embodiment of the present invention, a method for routing and switching operator RF signals is provided. The method includes providing one or more Digital Remote Units (DRUs), each configured to receive one or more downlink radio frequencies and to transmit one or more uplink radio frequencies and providing at least one Digital Access Unit (DAU) configured to communicate with at least one of the one or more DRUs. A first DRU of a first cell is operable to communicate using a first set of frequencies characterized by a first frequency band over a first geographic footprint and a plurality of additional DRUs of the first cell are operable to communicate using a second set of frequencies characterized by a second frequency band different from the first frequency band over a second geographic footprint surrounding the first geographic footprint. A first DRU of a second cell is operable to communicate using the first set of frequencies over a third geographical footprint and a plurality of additional DRUs of the second cell are operable to communication using a third set of frequencies characterized by a third frequency band different from the first frequency band over a fourth geographic range surrounding the third geographic range.

The DRUs can comprise remote radio units. The method may also include communicating between a plurality of Base Transceiver Stations (BTS) coupled to the at least one DAU. One or more of the plurality of BTSs can be coupled to the DAU using a plurality of BTS sector RF connections. The method may further include transporting signals between one or more DRUs and the at least one DAU.

According to another embodiment of the present invention, a method of distributing communications frequencies is provided. The method includes providing a set of communications units in an array configuration and transmitting and receiving, from a first communications unit of the set of communications units, a first set of frequencies characterized by a first frequency band and a first geographic footprint and a second set of frequencies characterized by a second frequency band different from the first frequency band and a second geographic range surrounding the first geographic footprint. The method also includes transmitting, and receiving, from a second communications unit of the set of communications units, a third set of frequencies including one or more frequencies in the first frequency band and a third geographical footprint and a fourth set of frequencies including one or more frequencies in a third frequency band and a fourth geographical footprint surrounding the third geographical footprint.

In an embodiment, the set of communications units include a plurality of remote units in communication with a host unit. The first geographic footprint can be centered on the first communications unit. The second geographic footprint can be a peripheral footprint centered on the first communications unit. The third geographical footprint can be centered on the second communications unit. The fourth geographical footprint can be a peripheral footprint centered on the second communications unit. The second geographical footprint can abut the fourth geographical footprint. The method can also include transmitting, and receiving, from a third communications unit of the set of communications units, a fifth set of frequencies including one or more frequencies in the first frequency band and a fifth geographical footprint and a sixth set of frequencies in a fourth frequency band and a sixth geographical footprint surrounding the fifth geographical footprint.

According to yet another embodiment, a communications system is provided. The communications system includes a first communications unit operable to transmit and receive communications using a first set of frequencies in a first frequency range and associated with a first geographical footprint and a second set of frequencies in a second frequency range and associated with a second geographical footprint and a second communications unit operable to transmit and receive communications using one or more of the first set of frequencies in a region associated with a third geographical footprint and one or more of the second set of frequencies in a region associated with a fourth geographical footprint.

The first communications unit can include a central DRU and a plurality of peripheral DRUs disposed adjacent the central DRU. The system can also include a DAU communicatively coupled to the central DRU and the plurality of peripheral DRUs. In an embodiment, the system includes a DAU communicatively coupled to the central DRU. Additionally, a second DAU can be communicatively coupled to the plurality of peripheral DRUs. In an embodiment, the second geographical footprint at least partially surrounds the first geographical footprint. In another embodiment, the fourth geographical footprint at least partially surrounds the third geographical footprint or the second geographical footprint at least partially overlaps the fourth geographical footprint.

According to a specific embodiment, a frequency sharing system for a distributed antenna system is provided. The frequency sharing system includes a first frequency band characterized by a first frequency range and associated with a first geographic area associated with a first communications unit and a second frequency band characterized by a second frequency range different from the first frequency range and associated with a second geographic area at least partially surrounding the first geographic area. The frequency sharing system also includes a third frequency band overlapping at least a portion of the second frequency band and associated with a third geographic area associated with a second communications unit and a fourth frequency band overlapping at least a portion of the first frequency band and associated with a fourth geographic area at least partially surrounding the third geographic area.

The first geographic area can be characterized by a first border and the second geographic area can be characterized by a second border, wherein a predetermined distance separates the first border and the second border. The first frequency band and the second frequency band can be contiguous frequency bands. In an embodiment, the first frequency band comprises a first contiguous range of frequencies and the second frequency band comprises a second contiguous range of frequencies adjacent the first frequency band.

According to another specific embodiment, a communications system is provided and includes a first communications unit operable to transmit and receive communications using a first set of frequencies over a first predetermined area and a second communications unit operable to transmit and receive communications using a second set of frequencies over a second predetermined area. The first communications unit is operable to transmit and receive communications using a third set of frequencies over a third predetermined area and the second communications unit is operable to transmit and receive communications using at least a portion of the third set of frequencies over a fourth predetermined area.

The first communications unit can include a plurality of DRUs, at least one of the plurality of DRUs being coupled to a DAU. The third predetermined area can be at least partially surrounded by the first predetermined area and the fourth predetermined area can be at least partially surrounded by the second predetermined area. In an embodiment, the first set of frequencies, the second set of frequencies, and the third set of frequencies are distinct frequencies. The first communications unit and the second communications unit can be disposed in an array configuration. The first predetermined area overlaps at least a portion of the second predetermined area in some implementations and the third predetermined area includes a location of the first communications unit and the fourth predetermined area includes a location of the second communications unit. The first communications unit can include a first plurality of digital remote units and the second communications unit comprises a second plurality of digital remote units. The first set of frequencies can be associated with a first number of the first plurality of digital remote units and the third set of frequencies can be associated with another of the first plurality of digital remote units. The second set of frequencies can be associated with a first number of the second plurality of digital remote units and the third set of frequencies can be associated with another of the second plurality of digital remote units.

Numerous benefits are achieved by way of the present invention over conventional techniques. For instance, embodiments of the present invention control the amount of resources allocated to users located in different areas, thereby increasing the frequency efficiency and also improving the data rate for cell edge users. These and other embodiments of the invention along with many of its advantages and features are described in more detail in conjunction with the text below and attached figures.

BRIEF DESCRIPTION OF THE DRAWINGS

FIGS. 1A-1C illustrate different frequency reuse techniques according to embodiments of the present invention;

FIG. 1D illustrates, for the Hard Frequency Reuse case, the transmit/receive power as a function of frequency according to embodiments of the present invention;

FIG. 1E illustrates, for the Fractional Reuse case, the transmit/receive power as a function of frequency according to embodiments of the present invention;

FIG. 1F illustrates, for the Soft Frequency Reuse case, the transmit/receive power as a function of frequency according to embodiments of the present invention;

DETAILED DESCRIPTION OF SPECIFIC EMBODIMENTS

Figure 2:
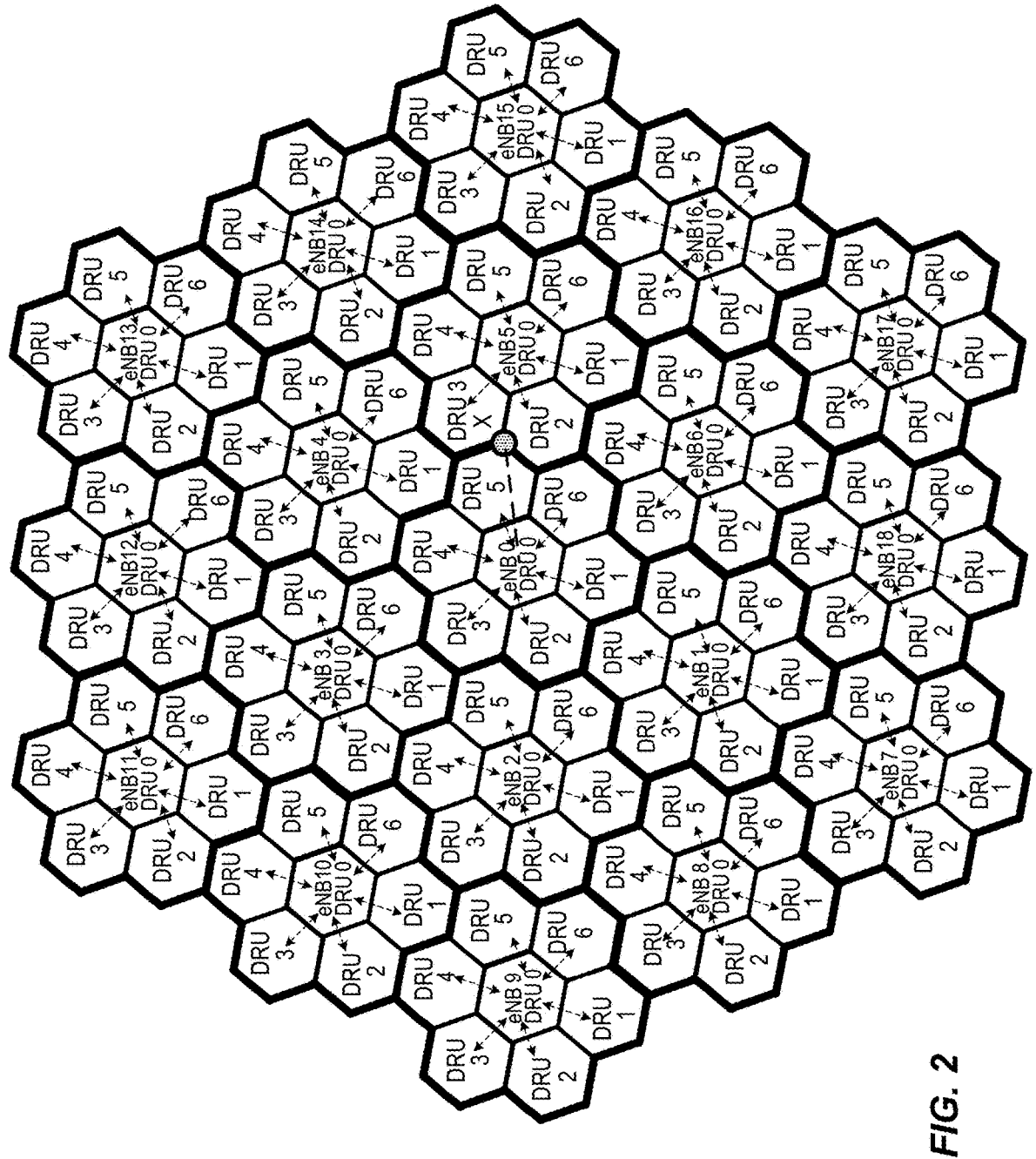
FIG. 2 illustrates the structure of a Distributed Antenna System (DAS) according to an embodiment of the present invention.

Embodiments of the present invention provide a new cell architecture combining two inter-cell interference mitigation techniques, Distributed Antenna System and Soft Frequency Reuse, to improve cell edge user's throughput when the system has full spectral efficiency.

Orthogonal Frequency Division Multiple Access (OFDMA) has been adopted as the transmission scheme for the next generation wireless communication systems. However, the downlink performance of cellular networks is known to be strongly limited by inter-cell interference in OFDMA based systems. In order to mitigate this interference, a number of techniques have recently been proposed, e.g. the Soft Frequency Reuse (SFR) scheme and Distributed Antenna System (DAS). According to embodiments of the present invention, these two techniques are combined in a unique cell architecture, which can be referred to as DAS-SFR. In an implementation of this architecture, which is described herein, the antennas are distributed in a hexagonal cell such that the central antenna is responsible for serving a special area using multiple frequency bands (e.g., all of the frequency bands) while the remaining antennas utilize only a subset of the frequency bands based on a frequency reuse factor. The inventors have analytically quantified the performance of the downlink multi-cell DAS-SFR in terms of the individual user's throughput under three different resource allocation scenarios. The results show that DAS-SFR reduces inter-cell interference in a multi-cell environment for users near the cell boundaries as compared to a Hard Frequency Reuse (HFR) scheme with a frequency reuse factor of 1. The results also show that DAS-SFR significantly increases the system capacity as compared to the HFR scheme with a frequency reuse factor of 3.

In DAS-SFR, by controlling the amount of resources allocated to users located in different areas, embodiments of the present invention increase the frequency efficiency and also improve the data rate for cell edge users. If the throughput requirement for the interior users is small, more resources can be assigned to the exterior users.

In the next generation wireless communication systems that use the 3GPP LTE (Long Term Evolution) standard, there is tremendous pressure to support a high data rate transmission. These systems are based on Orthogonal Frequency Division Multiple Access (OFDMA) to support the high data rate service and improve the Quality of Service (QoS), even for cell edge users as the main targets in the downlink.

The system bandwidth is divided into a number of sub-carriers in an OFDMA-based system such that each user utilizes a bandwidth smaller than the systems coherence bandwidth. Data from different users is transmitted in parallel on different sub-carriers. The orthogonality amongst the sub-carriers mitigates inter-carrier interference (ICI) while the resulting large OFDM symbol time and the narrow sub-carrier bandwidth reduces the effect of inter-symbol interference (ISI). Users located at the cell edge largely suffer from co-channel interference (CCI) or inter-cell interference from base stations (BS) of neighboring cells. Mobile 3GPP LTE adopts a frequency reuse factor of one, in which each cell serves users using the entire system bandwidth.

In order to reduce interference in cellular systems, several techniques have been incorporated in these standards. Advanced receiver techniques such as Maximum Likelihood (ML) Multiuser Detection (MUD), the MMSE Receiver MUD and Other-cell interference cancellation are three potential ways to reduce interference in cellular systems but these require a more complicated receiver. Advanced transmitter techniques such as Cooperative Encoding (CA), Closed-Loop MIMO Diversity Schemes (CLMD) and Beamforming are three other techniques to overcome the interference problem in cellular systems but CA requires very accurate channel state knowledge and real time inter-cell coordination, CLMD and Beamforming sacrifice spatial dimensions and require channel state knowledge.

One possible strategy to alleviate interference, both in the uplink and the downlink of cellular networks, is to reduce the overall transmit power by using a distributed antenna systems (DAS), which also has the additional advantage of improving capacity and coverage.

Other possible strategies include Frequency Reuse techniques, which effectively reduce inter-cell interference by geographically spacing the competing transmissions farther apart, which benefits users near the cell boundaries.

Distributed Antenna System (DAS) have been widely implemented in state-of-the art cellular communication systems to cover dead spots in wireless communications systems. As opposed to a conventional cellular system, where the antenna is centrally located, a DAS network consists of antenna modules that are geographically distributed to reduce access distance. These distributed antennas are connected to an eNodeB (eNB) LTE system by dedicated wires, fiber optics, or via a radio frequency link.

DAS has advantages including throughput improvement, coverage improvement, increased cellphone battery life, and a reduction in transmitter power. Recent research has shown benefits of using DAS in a cellular system for extending coverage, reducing call blocking rate and reducing inter-cell interference. An extension to a traditional DAS system is a Virtual DAS, wherein each remote has the added flexibility of independently transmitting preselected carriers.

Frequency reuse techniques are utilized herein to reduce inter-cell interference in cellular systems. This benefits users near the cell edges owing to simplicity and practicality. There are three major frequency reuse patterns illustrated in FIGS. 1A-1E for mitigating inter-cell interference: Hard Frequency Reuse, Fractional Frequency Reuse and Soft Frequency Reuse.

Hard Frequency Reuse (HFR) splits the system bandwidth into a number of distinct sub-bands according to a chosen reuse factor and lets neighboring cells transmit on different sub-bands. This inter-cell interference mitigation method is typically seen in GSM networks, when it comes to distribution of frequencies among the cells. When applied to LTE, the Resource Blocks (a group of sub-carriers) are divided into 3, 4 or 7 disjoint sets. These sets of Resource Blocks (RBs) are assigned to the individual eNBs in such a way that neighboring cells don't use the same set of frequencies, as illustrated in FIG. 1A. FIGS. 1D, 1E, and 1F show, for each case (Hard Frequency Reuse (FIG. 1A and FIG. 1D), Fractional Frequency Reuse (FIG. 1B and FIG. 1E), and Soft Frequency Reuse (FIG. 1C and FIG. 1F)), the transmit/receive power as a function of frequency. This reduces the interference at the cell edge of any pair of cells significantly and can be considered the opposite extreme to Full Frequency Reuse in matters of frequency partitioning techniques. While user interference at the cell edge is maximally reduced, the spectrum efficiency drops by a factor equal to the reuse factor. The inter-cell interference can be reduced with a frequency reuse factor of more than one, however, it may reduce the system capacity.

Fractional Frequency Reuse (FFR) is an inter-cell interference mitigation technique in OFDMA based wireless networks. OFDMA provides the ability for each eNB to selectively allocate frequency sub-bands, data rates and power to the users depending on their location in the cell, according to some predefined frequency reuse pattern which may lead to significant capacity gains for the overall network. FFR splits the given bandwidth into an inner and an outer region as illustrated in FIG. 1B. The spectrum allocated to the inner region is assigned to the nearby users (located close to the eNB in terms of path loss) applying a frequency reuse factor of one (i.e. the inner part is completely reused by all eNBs). While the spectrum allocated to the outer region, for users close to the cell edge (far users), is divided among the different eNBs as in hard frequency reuse techniques. This scheme is particularly useful to mitigate the inter-cell interference in the uplink, where severe interference situations can occur when the user is located close to a strong interferer from a neighbor cell.

Soft Frequency Reuse (SFR) is an inter-cell interference mitigation technique in OFDMA based wireless networks. SFR shares the overall bandwidth by all eNBs (i.e. a reuse factor of one is applied), but for transmission on each group of RBs, the eNBs are restricted to a certain power bound. FIG. 1C illustrates the power and frequency assignments in the different cells of a system with SFR for a reuse factor of 3. It can be noticed in the frequency spectrum of FIG. 1F associated with Soft Frequency Reuse (i.e., FIG. 1C), that there is a region of high-power transmissions and some regions of low-power transmissions. Using a similar strategy extending Fractional Frequency Reuse, resources in the high-power region are preferably assigned to User Equipment (UEs) located at the cell edge, while cell-center UEs are typically assigned resources in the low-power regions. SFR can utilize the entire frequency spectrum that has been allocated, increasing the system data rate and/or capacity.

Referring to FIGS. 1C-1F, frequencies in the grey frequency band (~upper ⅔ of the available frequencies) are transmitted/received by a DRU at a first power level in Cell 1, providing coverage for the central portion of Cell 1. Frequencies in the horizontal stripes band are transmitted/received by the DRU at a second power level higher than the first power level, providing coverage over both the central portion of Cell 1 as well as the peripheral portions of Cell 1 since the higher power level results in a larger coverage area. In this example, each cell utilizes a single DRU, although other embodiments can utilize multiple DRUs per cell as described more fully herein. DRUs in the other cells also transmit/receive at both high power for a subset of the frequencies and low power for remaining frequencies as shown in FIG. 1D, producing the coverage maps illustrated in FIG. 1C, with low power frequencies providing centralized coverage and higher power frequencies providing a large coverage area extending to the peripheral regions of the cells. Although all three cells are transmitting/receiving using overlapping (or the same) frequencies at low power, the corresponding propagation distances for these frequencies are smaller, preventing geographic overlap between the central grey regions.

In order to reduce interference in areas where cells are adjacent, the frequencies associated with higher power are grouped into subbands, with little or no overlap between the subbands. Referring to FIG. IF, in the SFR implementation, Cell 1 uses high power for the horizontal stripes band in approximately the first third of the frequency bandwidth, Cell 2 uses high power for the dotted band in approximately the second third of the frequency bandwidth, and Cell 3 uses high power for the vertical stripes band in approximately the last third of the frequency bandwidth. Thus, at the intersections between cells, since different portions of the available frequency band are being utilized, interference is reduced. Thus, in some embodiments, different frequency bands are utilized in adjacent cells, which is illustrated by the high power frequency bands for SFR in FIG. 1F: the first frequency band in Cell 1, the second frequency band different from the first frequency band in Cell 2, and the third frequency band different from the first frequency band and the second frequency band in Cell 3. For an additional number of cells, the subdivision of the available bandwidth can be increased as appropriate to the particular number of adjacent cells in the implementation. One of ordinary skill in the art would recognize many variations, modifications, and alternatives.

HFR, though simple in implementation, suffers from a reduced spectral efficiency. On the other hand, both SFR and FFR have increased (e.g., full) spectral efficiency and are a strong mechanism for inter-cell interference mitigation. A coordinated resource allocation system can be impractical in realistic settings involving a large number of eNBs, random traffic and realistic path-loss models. However, an encouraging result is that by using even limited (yet practical) levels of coordination, significant performance benefits can still be obtained over a conventional cellular architecture. Most of the recent publications have focused on investigating SINR advantages of DAS and analyzing its performance. On the other hand, there are no studies that combine DAS with SFR in order to reduce inter-cell interference. Some publications on DAS have focused on analyzing the uplink performance because of its analytical simplicity and there are few studies on the downlink performance of DAS although the demand for high-speed data rate will be dominant in the downlink path. There are also very few publications that consider the advantages of DAS in a multi-cell context. Recent research on FFR and SFR has focused on optimal system design utilizing advanced techniques such as graph theory and convex optimization to maximize network throughput. Additional works on FFR and SFR consider alternative schedulers and the authors determined the frequency partitions in a two-stage heuristic approach.

According to embodiments of the present invention, a new architecture is provided to suppress inter-cell interference. The architecture described herein combines DAS and SFR for an OFDMA system (e.g., LTE). Embodiments of the present invention provide benefits by using DAS-SFR in a multi-cell environment. The downlink advantages of DAS-SFR are described in terms of achievable ergodic capacity for three different frequency resource allocation scenarios. The results shows that a DAS-SFR architecture effectively addresses inter-cell interference in a multi-cell environment, especially at the cell boundaries when compared to a HFR cellular architecture and achieves a non-trivial capacity increase over a HFR cellular architecture with a frequency reuse factor of 3. Other reuse factors are included within the scope of the present invention, for example, up to or more than 7 as suitable for the DAS architecture illustrated in FIG. 2.

As described herein, an analytical framework has been developed to evaluate the ergodic capacity in a DAS-SFR architecture. This is an important metric to consider, especially for users at the cell-edge since modern cellular networks are increasingly required to provide users with high data-rate and a guaranteed quality-of-service, regardless of their geographic location, instead of simply a minimum user throughput which may be acceptable for applications like voice traffic. We present a strategy for optimally allocating frequency RBs to edge users for a DAS-SFR architecture, based on a chosen performance threshold $T_p$, which can be related to network traffic load. Finally we prepare a simulation scenario to compare the analytical results with the simulation results.

Referring to the spectral plots illustrated in FIG. 1D, in the HFR system, the horizontal stripes, shaded, and vertical stripes frequency bands occupy different frequency ranges and, in combination, fill the entire spectrum. In HFR (FIG. 1A), cell 1 uses the lower frequencies (horizontal stripes), cell 2 uses the middle frequencies (shaded), and cell 3 uses the higher frequencies (vertical stripes).

Referring to FIG. 2, the DAS includes a central cell referenced as eNB0, which includes DRU0 through DRU6 that are communicating through one base station at eNB0 through a DAU. DRU0 can be considered to be Cell 1 in FIGS. 1A-1C, DRU1 can be considered to be Cell 2 in FIGS. 1A-1C, and DRU2 can be considered to be Cell 3 in FIGS. 1A-1C. In other embodiments, eNB0 is considered to be Cell 1 in FIGS. 1A-1C and eBN1, including a different set of DRUs, DRU0 through DRU6, can be considered to be Cell 2 in FIGS. 1A-1C, etc. In FIG. 1A, Cell 1 (e.g., DRU0 of eNB0) utilizes the horizontal stripes frequency band and the other cells use different frequency bands as illustrated. In the embodiment illustrated in FIG. 2, seven different frequency bands could be utilized for high power transmission by the seven DRUs connected to each base station. For cells geographically separated from Cell 1, for example, cells in eNB7 could reuse the same frequencies (horizontal stripes) used in Cell 1 (e.g., eNB0).

Referring once again to FIG. 1B, a set of frequencies operating at reduced power compared to the frequencies discussed in relation to HFR and represented by the grey frequency bands in the FFR and SFR portion of FIGS. 1E and 1F, respectively, are reused in each of the cells (i.e., Cell 1, Cell 2, and Cell 3). Because this frequency band does not geographically overlap with adjacent cells (i.e., it is used at the central portion of the cell as a result of the lower power), overlap between adjacent cells is prevented and this frequency band can be reused in adjacent cells.

For fractional frequencies, because there is a spatial separation between the grey areas in the spectra in Cell 1 and Cell 2 and Cell 3, as long as the spatial separation is significant enough, there will not be significant interference between the cells although the central portions of the cells are transmitting on the same (e.g., exact same) frequencies. By keeping a separation and allocating the horizontal stripes frequency band in Cell 1 to specific frequencies, the shaded frequency band in Cell 2 to other specific frequencies, the vertical stripes frequency band in Cell 3 to still other specific frequencies, and the like for additional cells, embodiments of the present invention make efficient use of the given spectrum. Comparing the Fractional Frequency Reuse spectrum to the Hard Frequency Reuse spectrum, it is evident that FFR uses more of the available spectrum, which enables support for more users, operation at a higher data rate, combinations thereof, or the like. In the illustrated example, the fraction of the spectrum used in each cell has increased from about a third of the spectrum (HFR) to about half of the spectrum (FFR). Other implementations can utilized different fractions of the spectrum and the present invention is not limited to the particular example illustrated in FIG. 1B and FIG. 1E.

In one embodiment, to implement the fractional frequency reuse technique illustrated in FIG. 1B using the architecture illustrated in FIG. 2, DRUs 1, 2, 3, 4, 5 and 6 of eNB0 would transmit and receive data using frequencies in the horizontal stripe frequency band and DRU0 of eNB0 would transmit and receive data using the grey frequencies. In an embodiment, the size of the area covered by DRU0 can be increased by increasing the transmit power associated with the central DRU (i.e., DRU0). In another embodiment, each DRU in eNB0 transmits and receives data at a first power level using frequencies in the grey frequency bands and at a second, higher power level, using frequencies in the horizontal stripe/shaded/vertical stripe/etc. frequency bands. In this embodiment, three of the seven DRUs illustrated in an eNB are illustrated by Cells 1-3.

Referring to FIG. 1C, an architecture implementing Soft Frequency Reuse is illustrated and the matching spectrum in FIG. 1F illustrates the full use the spectrum by each of the adjacent cells. In an embodiment in which multiple DRUs are utilized per cell, the horizontal stripe geographical area in Cell 1 is associated with the outer DRUs in the communications unit illustrated as eNB0 in FIG. 2 (i.e., DRUs 1-6) and the grey geographical area in Cell 1 is associated with the central DRU in the communications unit illustrated as eNB0 in FIG. 2 (i.e., DRU0). As discussed above, the size of the grey circle can be increased/decreased by increasing/decreasing the power of utilized in conjunction with DRU0. As shown in the SFR spectrum for Cell 1, data is transmitted and received over the entire allocated spectrum, including portions of the spectrum that were unused for Cell 1 in the HFR example. The increase in spectrum provides increased data rate, increased capacity, combinations thereof, or the like. In other embodiments, a single DRU in Cell 1 broadcasts at low power over the grey band and at a higher power over the horizontal stripe spectrum. Other cells demonstrate similar behavior. One of ordinary skill in the art would recognize many variations, modifications, and alternatives.

Comparing FFR (FIG. 1B) and SFR (FIG. 1C), the frequency bandwidth available for the peripheral DRUs or for the higher power broadcast from a DRU in the cell (i.e., horizontal stripe, dotted, or vertical stripe spectra) is increased for SFR in comparison to FFR. Additionally, the frequency bandwidth available for the central DRU or for the lower power broadcast from the DRU in the cell (i.e., grey spectra) is also increased for SFR in comparison to FFR.

In an embodiment, fractional frequency reuse is implemented in a DAS system with a plurality of adjacent cells, each of the cells including a plurality of remote units. A first cell utilizes a first frequency bandwidth at a central portion of the cell (i.e., a central geographical area associated with a central DRU) and a second frequency bandwidth at peripheral portions of the cell (i.e., a peripheral geographical area associated with peripheral DRUs). A second cell utilizes a third frequency bandwidth at a central portion of the cell (i.e., a central geographical area associated with a central DRU) and the second frequency bandwidth at peripheral portions of the cell (i.e., a peripheral geographical area associated with peripheral DRUs).

In another embodiment, soft frequency reuse is implemented in a DAS system with a plurality of adjacent cells. A first cell utilizes a first frequency band at peripheral portions of the cell (i.e., a peripheral geographical area associated with peripheral DRUs) and a second frequency band (e.g., the remaining bandwidth) at a central portion of the cell (i.e., a central geographical area associated with a central DRU). A second cell utilizes a third frequency band at peripheral portions of the cell (i.e., a peripheral geographical area associated with peripheral DRUs) and a fourth frequency band, which may include multiple sub-bands (e.g., the remaining bandwidth) at a central portion of the cell (i.e., a central geographical area associated with a central DRU). The third frequency band may include frequencies in the second frequency band and the multiple sub-bands of the fourth frequency band may include frequencies in the first frequency band as illustrated in FIG. 1C.

As will be appreciated by one of skill in the art, operators utilize different spectrums and, in the examples illustrated in FIGS. 1D-1F, they are contiguous. However, it should be noted that although contiguous spectra are illustrated in FIGS. 1D-1F, this is not required by embodiments of the present invention and non-contiguous spectrums may be utilized in other embodiments. One of ordinary skill in the art would recognize many variations, modifications, and alternatives.

Although the embodiments illustrated in FIGS. 1D-1F utilize three frequencies, embodiments of the present invention are not limited to this particular number and additional frequencies and frequency bands can be utilized, for example, additional frequency bands used in conjunction with additional cells. In a particular embodiment, seven frequency bands, twelve frequency bands, or the like can be utilized. One of ordinary skill in the art would recognize many variations, modifications, and alternatives.

System Architecture (DAS-SFR)

The general architecture of a Virtualized DAS in a multi-cell environment is shown in FIG. 2, where 7 Digital Remote Units (DRUs) are connected to an eNB via an optical fiber and a Digital Access Unit (DAU). The DAUs are interconnected and connected to multiple sectors. This capability enables the virtualization of the eNB resources at the independent DRUs. The eNBs are linked to a public switched telephone network or a mobile switching center. DRUs are sectorized such that each DRU allocated to a given eNB sector is simulcast. For the simulcasting operation, the access network between each eNB and its DRUs should have a multi-drop bus topology. The DAUs assign the RBs of the various sectors to the independent DRUs. In contrast, the same area (7 DRUs) is covered by only a high-power eNB in traditional cellular system. The proposed architecture divides the entire spectral bandwidth F into 3 parts ($F_1$, $F_2$, $F_3$). The idea is that the eNB assigns the full-reused frequency (all 3 parts) to the central DRU and the other 6 edge DRUs work on just 1 part based on a reuse factor of $\Delta$ in such a way that neighbor cell edge DRUs don't use the same frequency part.

The total transmit power of the n-th DRU of i-th cell in f-th frequency part is denoted $P_n^{(i,f)}$, where the central DRU of each cell is index by n=0. Throughout this application, we assume that $P_n^{(i,f)}=P$.

We also consider the 2-tier cellular structure, where two continuous tiers of eighteen cells surround a given cell. Although this assumption of only 2-tiers of interfering cells is optimistic, a pessimistic assumption that all the DRUs and the eNB are transmitting full power all the time easily compensates.

Resource Allocation Scenarios:

In cellular DAS-SFR with multi users, there are several possible resource allocation scenarios using multiple DRUs. Much of the research on SFR system design has focused on how to determine the size of the frequency partition, for example, in a typical LTE system with a bandwidth of 5 MHz, 25 RBs may be available to serve users per each frequency part ($F_i$, i=1, 2, 3).

For a typical central cell, let's assume the center DRU is assigned the full-reused frequency and the other six edge DRUs are assigned to $F_1$. Now, we consider three resource allocation scenarios:

Scenario 1: All $F_1$, $F_2$, $F_3$ RBs are assigned to all users in the cell. Note that in this scenario, the very low SINR exterior users are inefficiently using the $F_2$ and $F_3$ RBs.

Scenario 2: $F_1$ RBs are assigned to all users but $F_2$ and $F_3$ RBs are solely assigned to interior users. Note that in this scenario, the available RBs are fully assigned to the interior users, which leads to a big gap between the numbers of allocated RBs to the interior users as compared to the exterior users.

Scenario 3: $F_1$ RBs are solely assigned to the exterior users, whereas the $F_2$ and $F_3$ RBs are assigned to the interior users. In this scenario, all RBs are more fairly assigned between all users, as compared to the previously mentioned scenario. Moreover, in this scenario the RBs are allocated to the users following a SINR-based approach, in which the edge users using the $F_1$ RBs, and the interior users using the $F_2$ and $F_3$ RBs have a high SINR.

We primarily assume a single user scenario, and further extend it to a uniformly distributed multiuser LTE system. In a multiuser scenario we investigate both the analytical and simulation results in order to verify the system's capacity improvement.

Channel Model and Received Signal

The downlink path of a DAS can be considered as an equivalent MIMO system with additive interference and noise. The received signal vector of the user in the $0^{th}$ cell at frequency f can be expressed as:

$$y^{(0,f)} = \text{signal} + \text{interference} + \text{noise} = H^{(0,f)}x^{(0,f)} + \sum_{i=1}^{18} H^{(i,f)}x^{(i,f)} + n \quad (1)$$

where $H^{(i,f)} \in C^{1\times 7}$, i=0, 1, . . . , 18, denotes the channel matrix between the DRUs in the i-th cell and the user in the central ($0^{th}$) cell, $x^{(i,f)}=[x_0^{(i,f)}, x_1^{(i,f)}, \ldots, x_6^{(i,f)}]^T \in C^{7\times 1}$, i=0, 1, . . . , 18 is the transmitted signal vector of the DRUs in the i-th cell, $n^{(f)} \in C^{1\times 1}$ denotes the white noise vector with distribution $C\mathcal{N}(0, \sigma_n^{(f)2}I_1)$.

The distributed antenna power constraint is considered, we have $$E[|x_n^{(i,f)}|^2] \leq P_n^{(i,f)}, n=0,1,\ldots,6, i=0,1,\ldots,18, \quad (2)$$

where in DAS-SFR, $x_n^{(i,F_1)}=0$, $P_n^{(i,F_1)}=0$ when (n=1, 2, . . . , 6 and i=1, 2, . . . , 7, 9, 11, 13, 15, 17), $x_n^{(i,F_2)}=0$, $P_n^{(i,F_2)}=0$ when (n=1, 2, . . . , 6 and i=0, 2, 4, 6, 7, 8, 10, 11, 12, 14, 15, 16, 18), $x_n^{(i,F_3)}=0$, $P_n^{(i,F_3)}=0$ when (n=1, 2, . . . , 6 and i=0, 1, 3, 5, 8, 9, 10, 12, 13, 14, 16, 17, 18), in DAS-HFR3 (frequency reuse factor 3), $x_n^{(i,F_1)}=0$, $P_n^{(i,F_1)}=0$ when (n=1, 2, . . . , 6 and i=1, 2, . . . 7, 9, 11, 13, 15, 17), $x_n^{(i,F_2)}=0$, $P_n^{(i,F_2)}=0$ when (n=1, 2, . . . , 6 and i=0, 2, 4, 6, 7, 8, 10, 11, 12, 14, 15, 16, 18), $x_n^{(i,F_3)}=0$, $P_n^{(i,F_3)}=0$ when (n=1, 2, . . . , 6 and i=0, 1, 3, 5, 8, 9, 10, 12, 13, 14, 16, 17, 18), in DAS-HFR1 (frequency reuse factor 1), $x_n^{(i,f)} \neq 0$, $P_n^{(i,f)} \neq 0$ when (n=0, 1, . . . , 6 and i=0, 1, . . . , 18, f=$F_1$, $F_2$, $F_3$), in Conventional Cellular-HFR3 (frequency reuse factor 3), $x_n^{(1,F_1)}=0$, $P_n^{(i,F_1)}=0$ when (n=0, 1, . . . , 6 and i=1, 2, . . . , 7, 9, 11, 13, 15, 17) or (n=1, 2, . . . , 6 and i=0, 8, 10, 12, 14, 16, 18), $x_n^{(i,F_2)}=0$, $P_n^{(i,F_2)}=0$ when (n=0, 1, . . . , 6 and i=0, 2, 4, 6, 7, 8, 10, 11, 12, 14, 15, 16, 18) or (n=1, 2, . . . , 6 and i=1, 3, 5, 9, 13, 17), $x_n^{(i,F_3)}=0$, $P_n^{(i,F_3)}=0$ when (n=0, 1, . . . , 6 and i=0, 1, 3, 5, 8, 9, 10, 12, 13, 14, 16, 17, 18) or (n=1, 2, . . . , 6 and i=2, 4, 6, 7, 11, 15), and in Conventional cellular-HFR1 (frequency reuse factor 1), $x_n^{(i,f)}=0$, $P_n^{(i,f)}=0$ when (n=1, . . . , 6 and i=0, 1, . . . , 18 and f=$F_1$, $F_2$, $F_3$), where $P_n^{(i,f)}$ denotes the power constraint of the n-th DRU in the i-th cell.

The composite fading channel matrix $H^{(i,f)}$, i=0, 1, . . . , 18, encompasses not only small-scale fading but also large-scale fading, which is modeled as $$H^{(i,f)} = H_w^{(i,f)} L^{(i,f)} \quad (3)$$

$$= [h_0^{(i,f)}, h_1^{(i,f)}, \ldots, h_6^{(i,f)}] \cdot \text{diag}\{l_0^{(i,f)}, l_1^{(i,f)}, \ldots, l_6^{(i,f)}\}$$

where $H_w^{(i,f)}$ and $L^{(i,f)}$ reflect the small-scale channel fading and the large-scale channel fading between the DRUs in the i-th cell and the user in the $0^{th}$ cell, respectively. $\{h_j^{(i,f)}|j=0, 1, \ldots, 6; i=0, 1, \ldots, 18; f=F_1, F_2, F_3\}$ are independent and identically distribute (i.i.d.) circularly symmetric complex Gaussian variables with zero mean and unit variance, and) $\{l_n^{(i,f)}|j=0, 1, \ldots, 6; i=0, 1, \ldots, 18; f=F_1, F_2, F_3\}$ can be modeled as $$l_n^{(i,f)} = \sqrt{[D_n^{(i)}]^{-\gamma} \chi_n^{(i,f)}}, n=0,1,\ldots,6, i=0,1,\ldots,18 \quad (4)$$

where $D_n^{(i)}$ and $\chi_n^{(i,f)}$ are independent random variables representing the distance and the shadowing between the user in the $0^{th}$ cell and the nth DRU in the i-th cell, respectively, $\gamma$ denotes the path loss exponent. $\{\chi_j^{(i,f)}|j=0, 1, \ldots, 6; i=0, 1, \ldots, 18; f=F_1, F_2, F_3\}$ are i.i.d random variables with probability density function (PDF)

$$f_\chi(\chi) = \frac{1}{\sqrt{2\pi}\lambda\sigma_\chi\chi}\exp\left(-\frac{(\ln\chi)^2}{2\lambda^2\sigma_\chi^2}\right), \chi > 0, \quad (5)$$

where $\sigma_\chi$ is the shadowing standard deviation and $$\lambda = \frac{\ln 10}{10}.$$

Since the number of interfering source is sufficiently large and interfering source are independent with each other, the interference plus noise is assumed to be a complex Gaussian random vector as follows:

$$N^{(f)} = \sum_{i=1}^{18} H^{(i,f)}x^{(i,f)} + n^{(f)} \quad (6)$$

The variance of N is derived by Central Limit Theorem as $$Var(N^{(f)}) = \left[\sum_{i=1}^{18}\sum_{n=0}^{6} [l_n^{(i,f)}]^2 P_n^{(i,f)} + \sigma_{n^{(f)}}^2\right]I_1 \quad (7)$$

$$= [\sigma^{(f)}]^2 I_1$$

Therefore, the received signal at the mobile station at a given symbol duration is given by $$y^{(0)} = H_w^{(0,f)} L^{(0,f)} x^{(0,f)} + N^{(f)} \quad (8)$$

Achievable Capacity of Distributed Antenna Network

If we assume the channel state information is known only at the receiver (CSIR) and the channel is ergodic, the ergodic Shannon capacity at a given location of the target mobile station can be calculated by $$C^{(f)} = E_{H_w^{(0,f)}} \left[ \log_2 \det \left( I_1 + \frac{1}{[\sigma^{(f)}]^2} (H_w^{(0,f)} L^{(0,f)}) P^{(0,f)} (H_w^{(0,f)} L^{(0,f)})^H \right) \right] \quad (9)$$

where $P^{(0,f)}$ is the covariance matrix of the transmitted vector x and given by diag $\{P_0^{(0,f)}, P_1^{(0,f)}, \ldots, P_6^{(0,f)}\}$. If ergodicity of the channel is assumed, the ergodic capacity can be obtained as $$C^{(f)} = E_{H_w^{(0,f)}} \left[ \log_2 \left( 1 + \frac{1}{[\sigma^{(f)}]^2} \sum_{i=0}^{6} |h_i^{(0,f)}|^2 [l_i^{(0,f)}]^2 P_i^{(0,f)} \right) \right] \quad (10)$$

$$= \int_{\gamma_f=0}^{\infty} \log_2(1 + \gamma_f) f_{\gamma_f}(\gamma_f) d\gamma_f$$

where $$\gamma_f = \frac{1}{[\sigma^{(f)}]^2} \sum_{i=0}^{6} |h_i^{(0,f)}|^2 [l_i^{(0,f)}]^2 P_i^{(0,f)}$$

is a weighted chi-squared distributed random variable with p.d.f given by $$f_{\gamma_f}(\gamma_f) = \sum_{i=0}^{6} \frac{[\sigma^{(f)}]^2 \pi_i}{[l_i^{(0,f)}]^2 P_i^{(0,f)}} \exp\left( -\frac{[\sigma^{(f)}]^2 \gamma_f}{[l_i^{(0,f)}]^2 P_i^{(0,f)}} \right), \quad (11)$$

where $$\pi_i = \sum_{k=0, k \neq i}^{6} \frac{[l_i^{(0,f)}]^2 P_i^{(0,f)}}{[l_i^{(0,f)}]^2 P_i^{(0,f)} - [l_i^{(0,f)}]^2 P_k^{(0,f)}}.$$

Then the ergodic capacity for MISO vector channel can be obtained in a simple form by $$C^{(f)} = \frac{1}{\ln 2} \sum_{i=0}^{6} \pi_i \exp\left( -\frac{[\sigma^{(f)}]^2}{[l_i^{(0,f)}]^2 P_i^{(0,f)}} \right) Ei\left( -\frac{[\sigma^{(f)}]^2}{[l_i^{(0,f)}]^2 P_i^{(0,f)}} \right), \quad (12)$$

$$f = F_1, F_2, F_3$$

where Ei(t) is the exponential integral function $$\left( Ei(t) = -\int_{-x}^{\infty} e^{-t}/t \, dt \right)$$

and can be easily calculated with popular numerical tools such as MATLAB and MAPLE.

Since the derivation for this MISO vector channel is a generalization of a SISO channel, the ergodic capacity for SISO channel is given, respectively, by $$C^{(f)} = \frac{1}{\ln 2} \sum_{i=0}^{6} \exp\left( -\frac{[\sigma^{(f)}]^2}{[l_i^{(0,f)}]^2 P_i^{(0,f)}} \right) Ei\left( -\frac{[\sigma^{(f)}]^2}{[l_i^{(0,f)}]^2 P_i^{(0,f)}} \right), \quad (13)$$

$$f = F_1, F_2, F_3$$

Thus, the total ergodic capacity of the system can be obtained by adding the capacity of the individual carriers, $$C_{total} = C^{(F1)} + C^{(F2)} + C^{(F3)} \quad (14)$$

Analytical and Simulation Results

Figure 3:
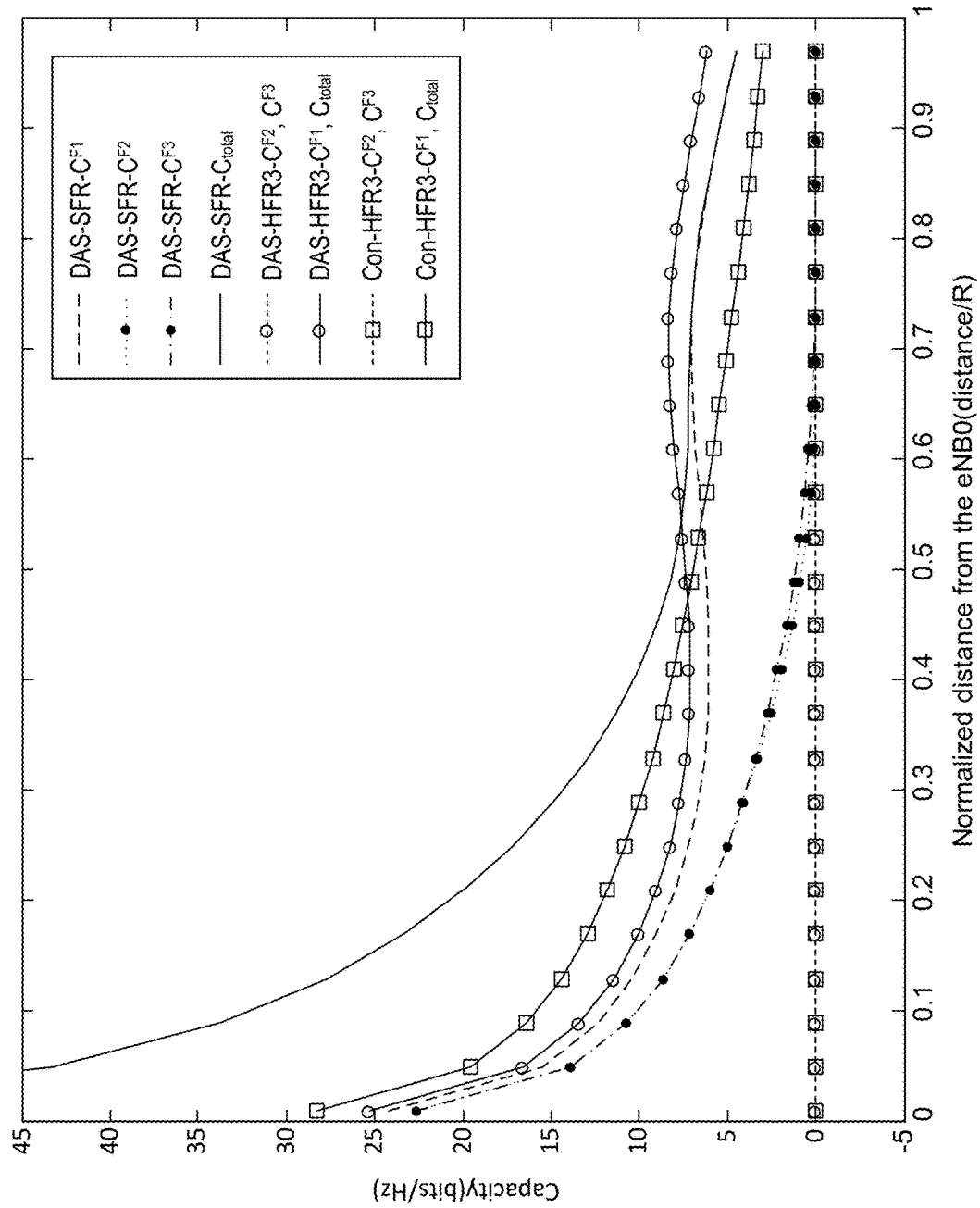
FIG. 3 is a plot illustrating ergodic capacity versus the normalized distance from the DRU0 according to an embodiment of the present invention.
Figure 4:
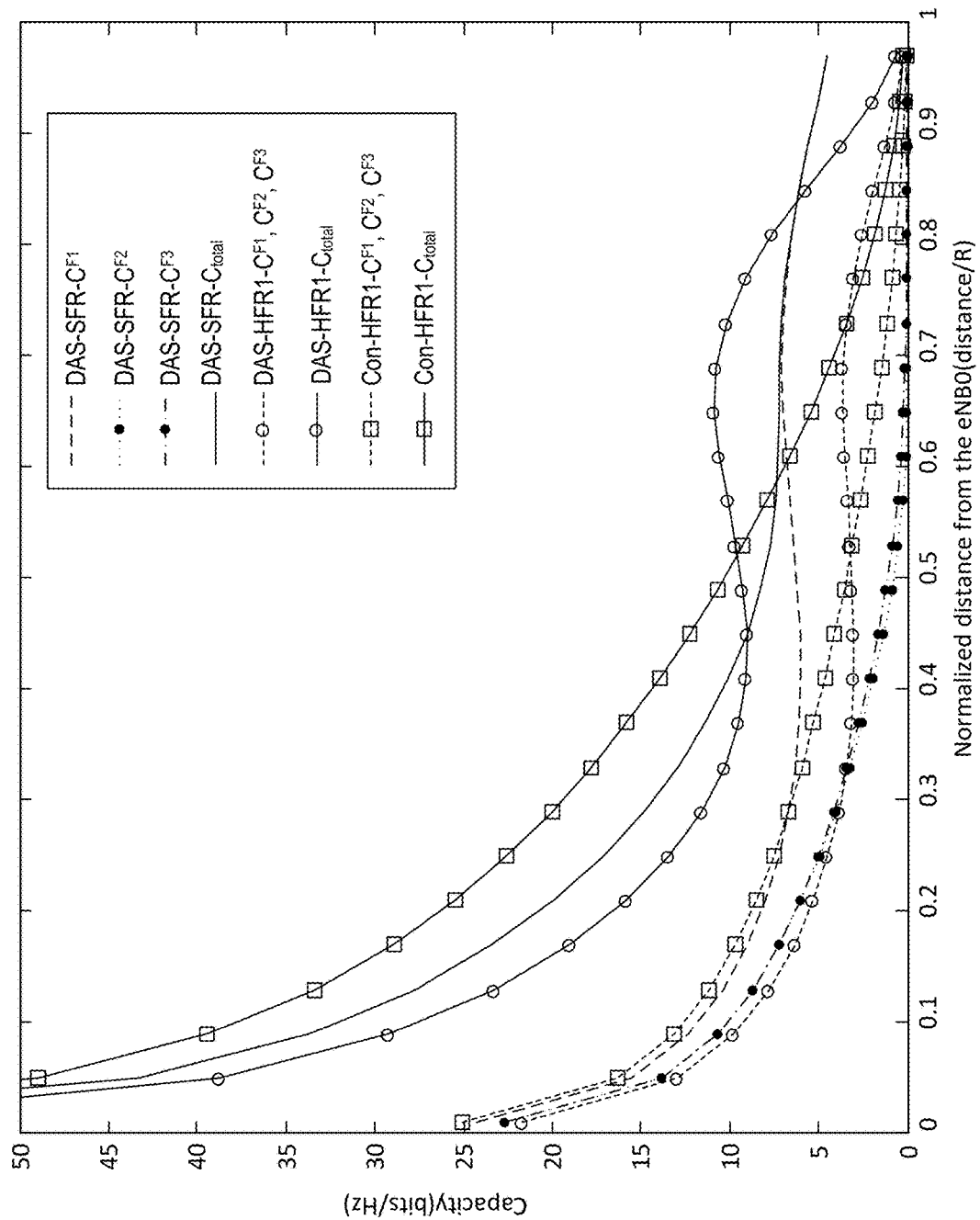
FIG. 4 is a plot illustrating ergodic capacity versus the normalized distance from the DRU0 according to another embodiment of the present invention.

FIG. 3 and FIG. 4 represents the ergodic capacity of cellular DAS for different frequency reuse techniques versus the normalized distance from the eNB0 DRU0 in the direction of the worst case position X when the path loss exponent is 3.76. Each scenario is plotted for the individual capacities $C^{(F1)}$, $C^{(F2)}$, $C^{(F3)}$, and also for the total capacity $C_{total}$.

The transmit power of each distributed antenna module is P whereas the transmit power of eNB in the conventional cellular system is 7P. These figures show an interesting non-monotonic relationship between capacity and the normalized distance from the base station. This is because the signal from a distributed antenna module becomes dominant around 0.6R.

FIG. 3 compares the capacity performance of the two frequency reuse techniques, SFR and HFR3, for a particular central cell. Note that in the SFR technique, all 3 frequency bands are assigned, whereas, in the HFR3 method, only the $F_1$ band is used. The results show that the SFR method achieves the highest throughput, owing to use of more frequency bandwidth. More specifically, the total capacity achieved using the SFR method is the highest inside the normalized distance 0.5.

A non-significant throughput reduction in the SFR technique is observed happening beyond a normalized distance 0.5, due to the interference introduced from the neighboring central DRU cells. Note that there is no interference introduced from the DRU neighboring cells when the HFR3 method is applied. It is worth mentioning that the achieved throughput of the DAS-HFR3 is slightly lower than that of a conventional cellular (Con-HFR3) system near the eNB0 DRU0, due to the reduced transmit power.

FIG. 4 compares the capacity performance of the two frequency reuse techniques, SFR and HFR1, for a particular central cell. Note that in both SFR and HFR1 techniques, all 3 frequency bands are assigned. The achieved throughputs of the DAS-HFR1 and DAS-SFR are slightly lower than that of a conventional cellular (Con-HFR1) system near the eNB0 (DRU0), due to the reduced transmit power.

FIG. 4 illustrates that the HFR1 technique outperforms the SFR technique in terms of the achieved throughput inside the (0, 0.5R) region, nevertheless, the SFR technique significantly improves the system performance by making up for the dead spots happening at the cell edges. Note that there is a significant amount of interference happening in the (0.8R,R) region, creating dead-spots in the HFR1 technique.

Note that 80% of the users are located inside the (0.5R, R) region, assuming a uniform distribution, while the other 20% are farther from the interfering cells. Therefore, it is more important to improve the system capacity inside the (0.5R,R) region.

In multiuser systems, where all users are uniformly distributed in the cell, we need to consider different resource allocation scenarios which were defined above. Assuming that each cell has radius R, we define parameter α (0<α<1)

such that the interior area is located in the (0, αR) region and the exterior area is located in the (αR,R) region.

In LTE systems, eNB distinguishes between the interior and exterior users based on their corresponding uplink power received at the central DRU. To implement this technique, we propose a threshold $T_p$ as a parameter in eNB such that users with uplink power higher than $T_p$ are assigned as interior users, and vice versa.

Note that $$N_{interior} = \alpha^2 N_{users},$$

$$N_{exterior} = (1-\alpha^2) N_{users}, \quad (15)$$

where $N_{interior}$ represents the number of interior users, $N_{exterior}$ represents the number of exterior users, and $N_{users}$ represents the total number of users. We will consider the 3 different resource allocation scenarios mentioned above, where the number of RBs per users assigned in the different regions (interior or exterior) for different Scenarios can be expressed as in TABLE 1, where $N_{RB}^{(F_i)}$, i=1, 2, 3 represents the number of RBs for given frequency part $F_i$ and $N_{RB}^{(F_i)^{tech}}$ represent the number of RBs for given $F_i$ for the different techniques.

Note that in all 3 scenarios we have applied the Round Robin scheduling technique.

If we consider the number of RBs which are assigned to the different regional users under the different scenarios, the capacity metric of the total system can be obtained by, $$C_{metric}^{total,tech} = C_{metric}^{(tech,F_1)} + C_{metric}^{(tech,F_2)} + C_{metric}^{(tech,F_3)} \quad (16)$$

where $$C_{metric}^{(tech,F_i)} = N_{RB(F_i)}^{tech} \cdot C^{(F_i)}, \, i=1, 2, 3,$$

$$\text{tech} \in \left\{ \begin{array}{l} DAS-SFR-SC1, DAS-SFR-SC2, DAS-SFR-SC3, \\ DAS-HFR3, Con-HFR3, DAS-HFR1, Con-HFR1 \end{array} \right\}.$$

Figure 5:
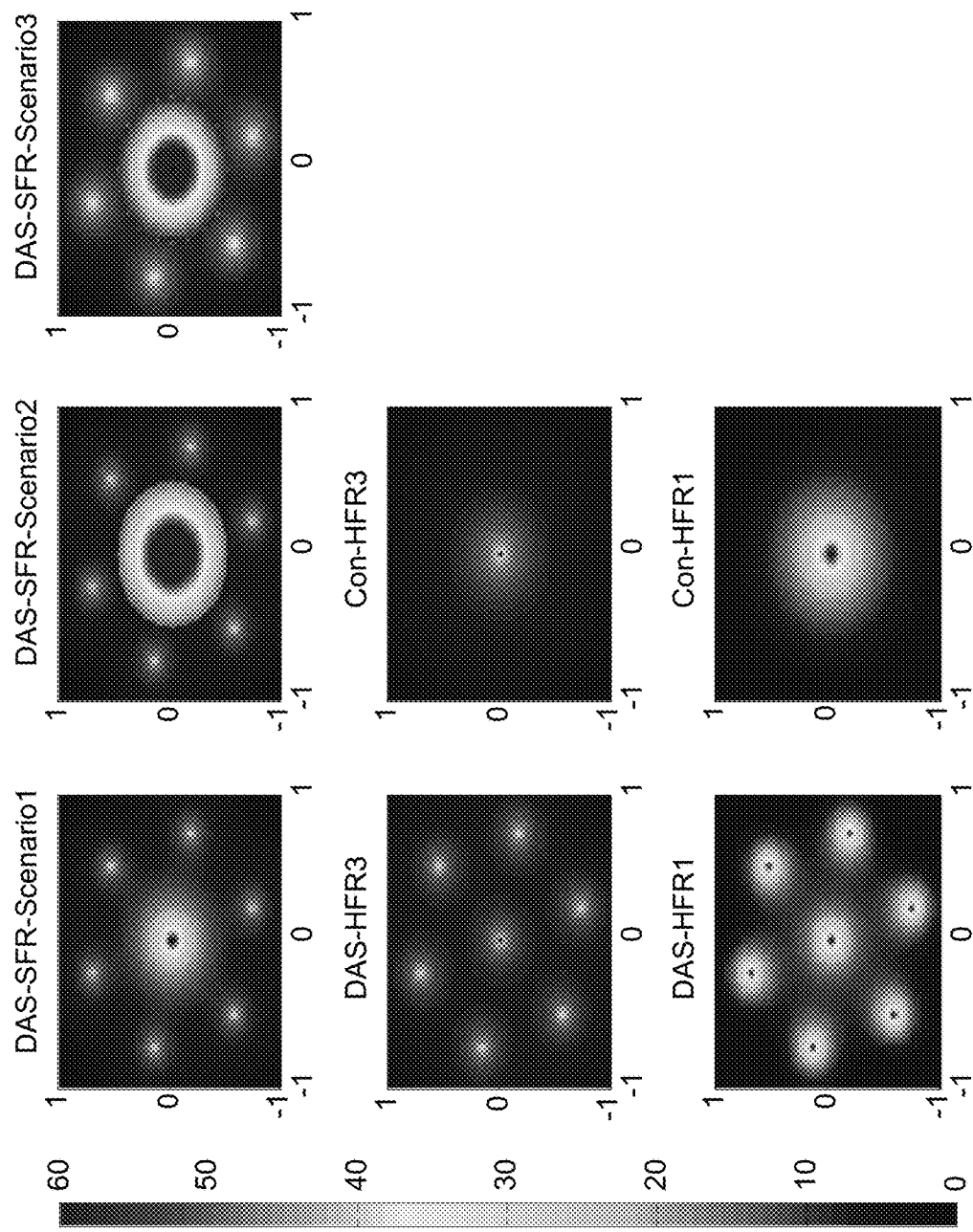
FIG. 5 illustrates a capacity metric for a multiuser case versus the normalized distance from the DRU0 in eNB0 (central cell) area according to an embodiment of the present invention.

In FIG. 5, the capacity metric is provided considering a uniform distribution of users and a Round Robin Scheduler. In this example, which illustrates the capacity metric for a multiuser case versus the normalized distance from the DRU0 in eNB0 (central cell) area, we assume α is 0.5. The achieved capacity of the DAS-SFR architecture with Scenario2 and Scenario3 is higher than that of DAS-SFR system with Scenario1, especially near the central DRU. This is due to the fact that the $F_2$ and $F_3$ RB s are not assigned to the exterior users which have very low SINR and all $F_2$ and $F_3$ RBs assigned to interior users.

Comparing Scenario2 with Scenario3, we observe that the achievable capacity for interior users in DAS-SFR architecture with Scenario2 is slightly higher than that of scenario3 due to the full frequency reuse for the interior users in Scenario2. However, in Scenario3, only the $F_2$ and $F_3$ frequency bands are used by the interior users. Conversely, the achieved capacity for exterior users in a DAS-SFR architecture with Scenario3 is slightly higher than that of Scenario 2, due to the fact that all $F_1$ RBs are used by the exterior users, whereas in Scenario2 the $F_1$ RBs are partially used by the exterior users.

Note that FIG. 5 illustrates that the DAS-HFR1 technique outperforms other techniques in terms of the achieved throughput by majority of the interior users; nevertheless, SFR technique significantly improves the system performance by making up for the dead spots which appear at the cell edges. Note that there is a significant amount of interference happening in the (0.8R,R) region, causing the dead spots in DAS-HFR1 technique.

In the established system environment, we evaluate the total system capacity for several cases for non-edge users (inside (0, 0.8R) region) and edge users (inside 0.8R,R)). We assume α sweeps from 0.2 to 0.8. Remember that α manages the portion of resources allocated in Scenario2 and Scenario3.

Figure 6:
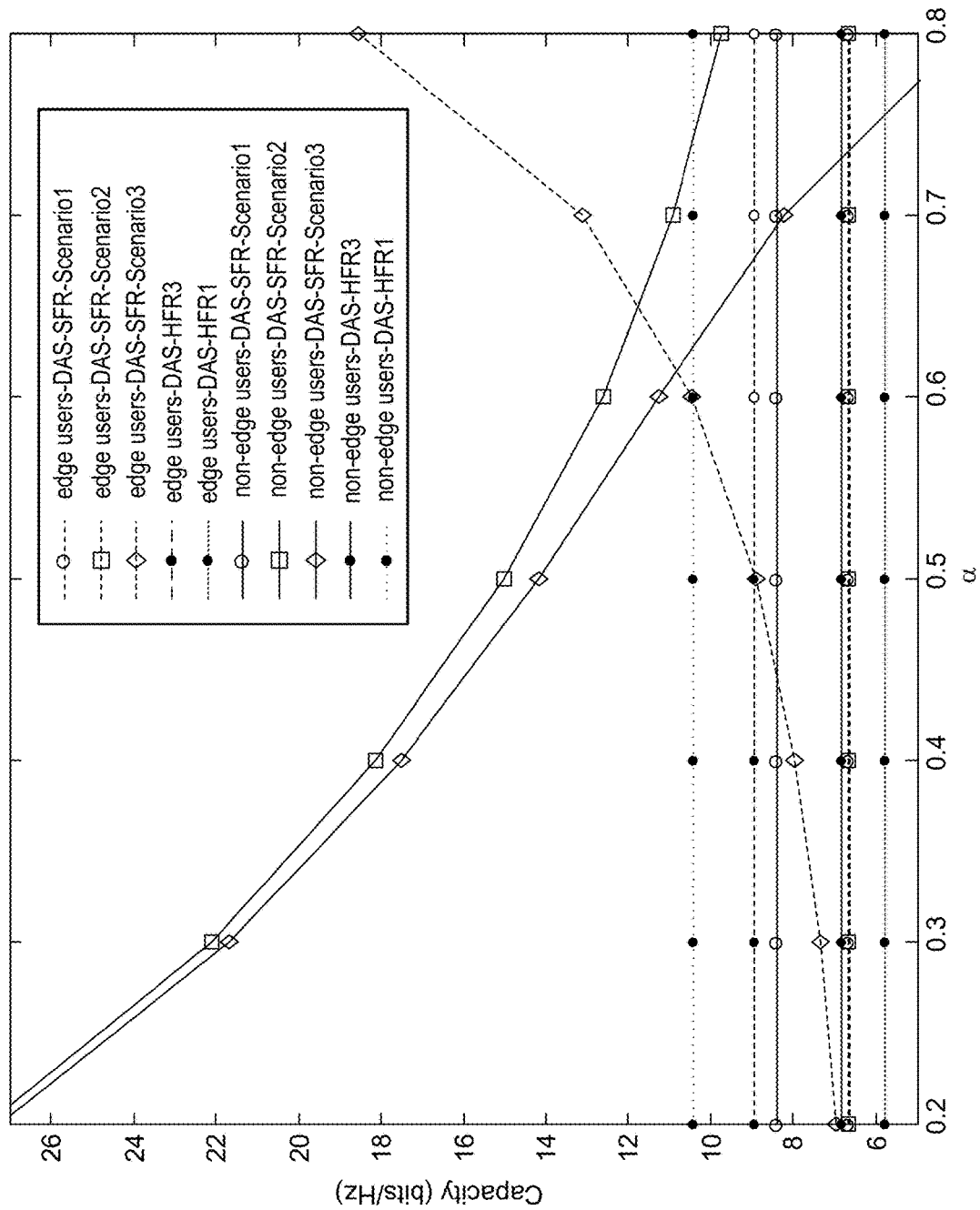
FIG. 6 is a plot illustrating analytical ergodic capacity for edge cell and non-edge cell users versus $\alpha$ according to an embodiment of the present invention.

FIG. 6 illustrates the analytical results for the non-edge users and edge users, where α varies between 0.2 and 0.8, that is, the analytical ergodic capacity for edge cell and non-edge cell users versus the parameter α.

Note that as α changes, the number of RBs assigned to the users in Scenario2 and Scenario3 changes accordingly. However, in other techniques, with changing α, number of assigned RBs to the users remains unaltered. As α increases, the edge user's throughput increases in Scenario3, due to the fact that more RBs are assigned to those users. Specifically, as α increases, less users need to use $F_1$ RBs in Scenario3. However, in other techniques, edge users experience a constant throughput, due to the fact that the number of RBs allocated to the edge users remains constant as α changes. Specifically, regardless of the changes in α, all $F_1$ RBs are assigned to all users.

As α increases, non-edge users' throughput decreases, due to the fact that the total constant number of $F_2$ and $F_3$ RBs should be assigned to more number of users accordingly. Note that the rate of decrease in user throughput for non-edge users for Scenario3 is more than that of Scenario2, as α increases. The reason behind this is that the rate of decrease in number of RBs assigned to the non-edge users in Scenario3 is more than that of Scenario2. Specifically, as was previously mentioned, since no $F_1$ RBs are assigned to the non-edge users in Scenario3, non-edge users' throughput in Scenario3 is less than that of Scenario2.

The capacity of the above mentioned architectures is investigated through the system level simulation. We consider the two-ring hexagonal cellular system with nineteen eNBs, such that each cell has 7 DRUs, as in FIG. 2, where the eNBs distance is 500 meters. The 10 UEs are located in each DRU area, following a uniform distribution. An eNB allocates the available RBs to UEs by estimating the signaling and uplink power of UEs. We use the simulation parameters listed in TABLE 2.

At a TTI of simulation, the eNB in a cell gathers the CQI information of UEs and allocates the RBs to each UE using the Round Robin scheduling technique. The throughput of a UE is obtained based on the SINR of the UE in the assigned RB. In system level simulation, SINR is determined by the path loss and lognormal fading measured in RB. The throughput of a UEm is estimated using the Shannon capacity as follows $$C_m^{(f)} = W_{RB}^{(f)} \log(1 + SINR_m^{(f)}), f = F_1, F_2, F_3 \quad (16)$$

where, $W_{RB}^{(f)}$ is the bandwidth of RBs assigned to a UE and $SINR_m^{(f)}$ is the SINR of a UEm. The cell capacity in each region is total throughput of UEs in the corresponding region and is expressed as follows $$C_{total} = \sum_{i=1}^{3} \sum_{m=1}^{M} C_m^{(F_i)} \quad (17)$$

where M is the number of UEs in a group.

Figure 7:
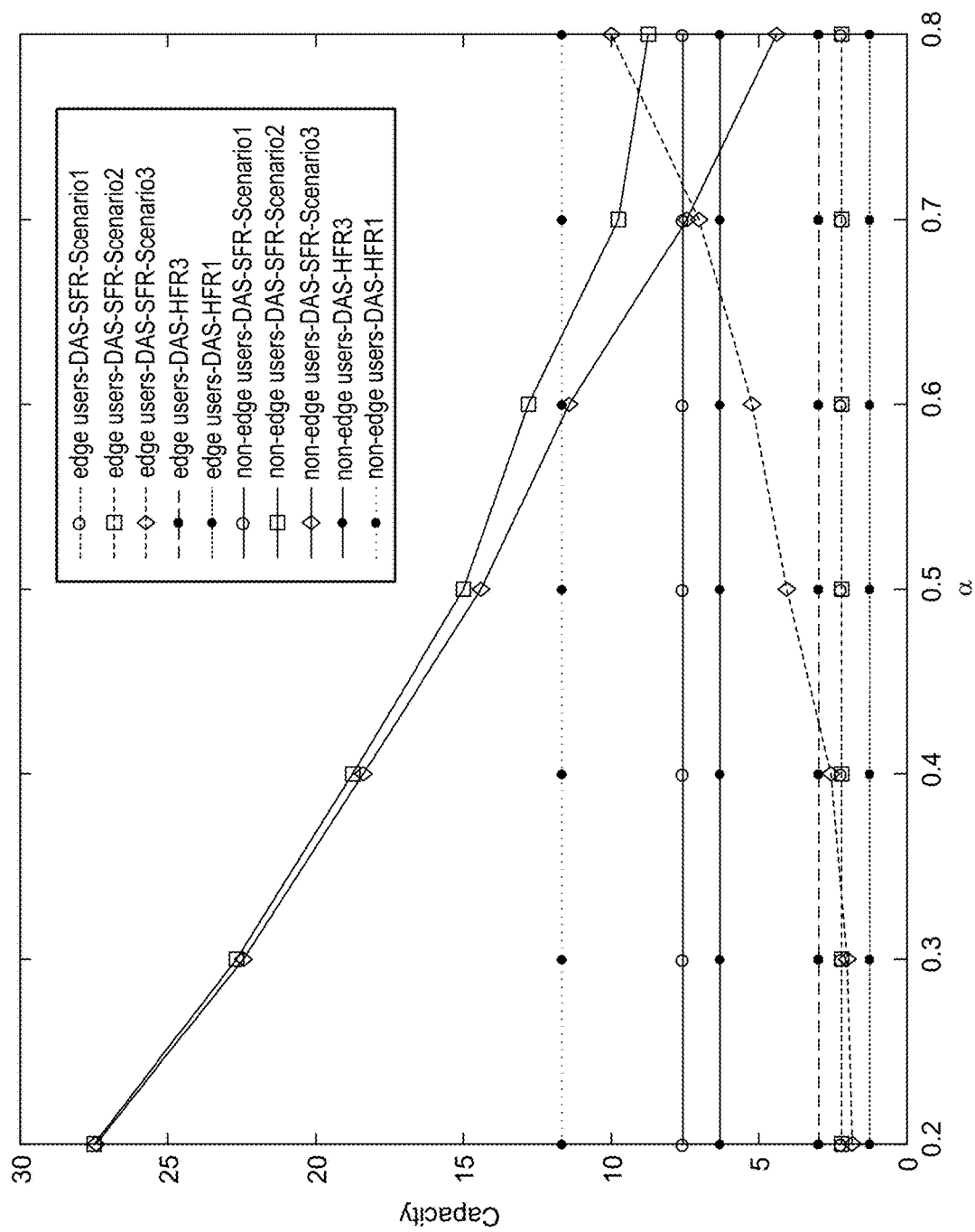
FIG. 7 is a plot illustrating simulation capacity for edge cell and non-edge cell users versus $\alpha$ according to an embodiment of the present invention.

FIG. 7 illustrates the simulation results for the non-edge users and edge users (i.e., the simulated capacity for edge cell and non-edge cell users versus the parameter α, where α varies between 0.2 and 0.8. The results obtained through simulation corroborate the results provided by analytical methods.

The overall capacity increases by using the SFR technique, since the spectral efficiency in the interior region is higher than that in the exterior region when compared to HFR3 technique. The cell edge user's throughput increases by using the SFR technique, since the interference signal from neighbor cells is lower than that when we use HFR1 technique. In an embodiment using Scenario3 as a resource allocation strategy, the exterior user's throughput is increased.

Figure 8:
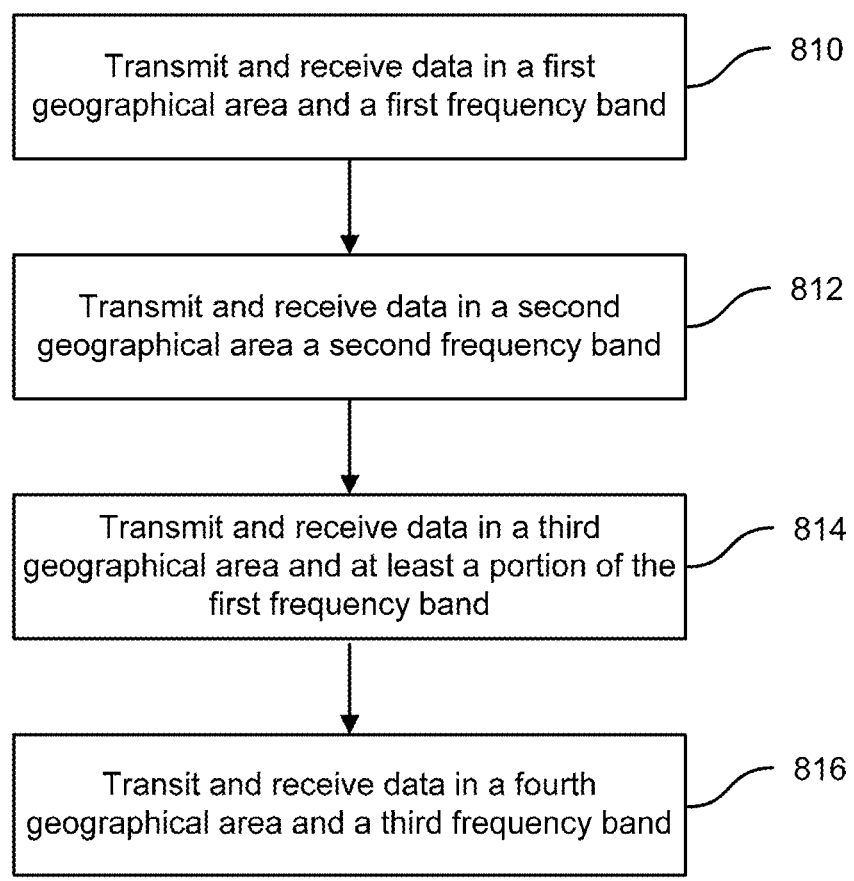
FIG. 8 is a simplified flowchart illustrating a method of implementing soft frequency reuse according to an embodiment of the present invention.

FIG. 8 is a simplified flowchart illustrating a method of implementing soft frequency reuse according to an embodiment of the present invention. The method 800 includes transmitting and receiving data in a first geographical area and a first frequency band (810). The method also includes transmitting and receiving data in a second geographical area and a second frequency band (812). In an embodiment, the first geographical area is a central area of a cell including multiple DRUs and the second geographical area is a peripheral area of the cell. In another embodiment, the second geographical area includes and extends to an area larger than the first geographical area (e.g., an area surrounding the first geographical area). The method further includes transmitting and receiving data in a third geographical area and at least a portion of the first frequency band (814). At least a portion of the frequency band used for the third geographical area is thus reused in relation to the first geographical area. The method also includes transmitting and receiving data in a fourth geographical area and a third frequency band (816). In an embodiment, the third geographical area is a central area of a cell including multiple DRUs and the fourth geographical area is a peripheral area of the cell. In another embodiment, the fourth geographical area includes and surrounds the third geographical area. The third frequency band may overlap with part of the first frequency band. Accordingly, multiple cells reuse the portions of the first frequency band, which may include multiple sub-bands that are contiguous or separated in frequency domain, in multiple adjacent cells.

It should be appreciated that the specific steps illustrated in FIG. 8 provide a particular method of implementing soft frequency reuse according to an embodiment of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 9:
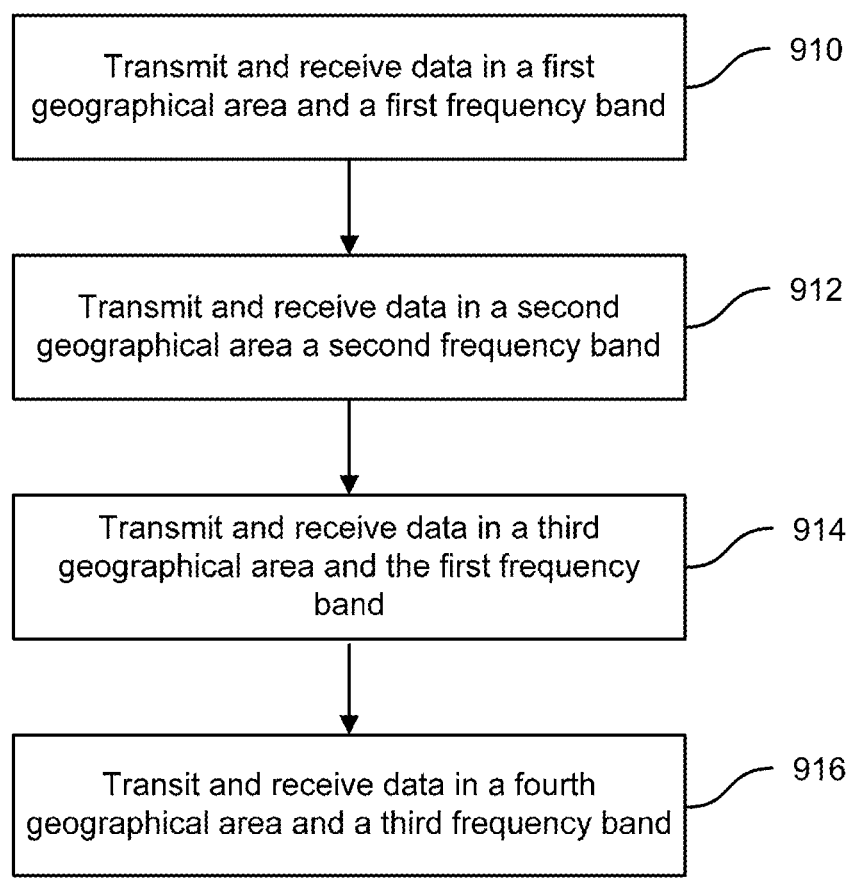
FIG. 9 is a simplified flowchart illustrating a method of implementing fractional frequency reuse according to an embodiment of the present invention.

FIG. 9 is a simplified flowchart illustrating a method of implementing fractional frequency reuse according to an embodiment of the present invention. The method 900 includes transmitting and receiving data in a first geographical area and a first frequency band (910) and transmitting and receiving data in a second geographical area and a second frequency band (912). In an embodiment, the second geographical area surrounds the first geographical area. As an example, the first geographical area can be a central portion of a cell that is covered by a central DRU and the second geographical area can be a peripheral portion of the cell that is covered by a plurality of peripheral DRUs.

The method further includes transmitting and receiving data in a third geographical area and the first frequency band (914) and transmitting and receiving data in a fourth geographical area and a third frequency band (916). In an embodiment, the third geographical area surrounds the fourth geographical area. As an example, the third geographical area can be a central portion of another cell that is covered by a central DRU and the fourth geographical area can be a peripheral portion of the another cell that is covered by a plurality of peripheral DRUs. Thus, the frequency band used at the central portion of the first cell is reused at the central portion of the second cell. In embodiments, the frequency bands are not limited to contiguous blocks of frequencies, but can include sub-bands each including one or more frequency. The third frequency band can be different from the second frequency band, providing differing frequencies for the differing cells at adjacent geographical areas.

It should be appreciated that the specific steps illustrated in FIG. 9 provide a particular method of implementing fractional frequency reuse according to an embodiment of the present invention. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

TABLE 1

| | Number of RBs per user | | | | | |
|---|---|---|---|---|---|---|
| | Interior region | | | Exterior region | | |
| | $F_1$ | $F_2$ | $F_3$ | $F_1$ | $F_2$ | $F_3$ |
| $N_{RB(F)}^{DAS-SFR-SC1}$ | $\dfrac{N_{RB(F_1)}}{N_{users}}$ | $\dfrac{N_{RB(F_2)}}{N_{users}}$ | $\dfrac{N_{RB(F_3)}}{N_{users}}$ | $\dfrac{N_{RB(F_1)}}{N_{users}}$ | $\dfrac{N_{RB(F_2)}}{N_{users}}$ | $\dfrac{N_{RB(F_3)}}{N_{users}}$ |
| $N_{RB(F)}^{DAS-SFR-SC2}$ | $\dfrac{N_{RB(F_1)}}{N_{users}}$ | $\dfrac{N_{RB(F_2)}}{\alpha^2 N_{users}}$ | $\dfrac{N_{RB(F_3)}}{\alpha^2 N_{users}}$ | $\dfrac{N_{RB(F_1)}}{N_{users}}$ | 0 | 0 |

TABLE 1-continued

Number of RBs per user

| | Interior region | | | Exterior region | | |
|---|---|---|---|---|---|---|
| | $F_1$ | $F_2$ | $F_3$ | $F_1$ | $F_2$ | $F_3$ |
| $N_{RB}^{(F)DAS\text{-}SFR\text{-}SC3}$ | 0 | $\dfrac{N_{RB}^{(F_2)}}{\alpha^2 N_{users}}$ | $\dfrac{N_{RB}^{(F_3)}}{\alpha^2 N_{users}}$ | $\dfrac{N_{RB}^{(F_1)}}{(1-\alpha^2)N_{users}}$ | 0 | 0 |
| $N_{RB}^{(F)DAS\text{-}HFR3}, N_{RB}^{(F)Con\text{-}HFR3}$ | $\dfrac{N_{RB}^{(F_1)}}{N_{users}}$ | 0 | 0 | $\dfrac{N_{RB}^{(F_1)}}{N_{users}}$ | 0 | 0 |
| $N_{RB}^{(F)DAS\text{-}HFR1}, N_{RB}^{(F)Con\text{-}HFR1}$ | $\dfrac{N_{RB}^{(F_1)}}{N_{users}}$ | $\dfrac{N_{RB}^{(F_2)}}{N_{users}}$ | $\dfrac{N_{RB}^{(F_3)}}{N_{users}}$ | $\dfrac{N_{RB}^{(F_1)}}{N_{users}}$ | $\dfrac{N_{RB}^{(F_2)}}{N_{users}}$ | $\dfrac{N_{RB}^{(F_3)}}{N_{users}}$ |

TABLE 2

Simulation Parameters

| Parameters | Value |
|---|---|
| Channel Bandwidth for each Frequency Part | 5 MHz |
| Carrier Frequency | 2.14 GHz |
| FFT size | 1024 |
| Number of Resource Blocks for each Frequency Part | 25 |
| Subcarrier Spacing | 15 kHz |
| Cellular Layout | Hexagonal grid, 19 sites |
| Inter-eNB Distance | 500 meters |
| Log-normal Shadowing | 8 dB |
| Propagation loss | $128.1 + 37.6 \log_{10}(R(km))$ |
| White Noise Power Density | −174 dBm/Hz |
| Scheduling | Round Robin |
| TTI | 1 ms |

What is claimed is:

1. A communication system comprising:
a host unit;
a first central remote unit coupled to the host unit and operable to transmit and receive radio frequency (RF) communications using first resources over a first geographic region corresponding to a central portion of a first cell having a first geographic footprint;
one or more first outer remote units coupled to the host unit and operable to transmit and receive RF communications using second resources over a second geographic region corresponding to an outer portion of the first cell, wherein the first resources are at least partially distinct from the second resources;
a second central remote unit coupled to the host unit and operable to transmit and receive RF communications using third resources over a third geographic region corresponding to a second central portion of a second cell having a second geographic footprint; and
one or more second outer remote units coupled to the host unit and operable to transmit and receive RF communications using fourth resources over a fourth geographic region corresponding to an outer portion of the second cell, wherein the resources are at least partially distinct from the fourth resources, and a border of the first geographic footprint at least partially overlaps with a border of the second geographic footprint.

2. The communication system of claim 1, wherein the second geographic region completely surrounds the first geographic region.

3. The communication system of claim 1, wherein the first resources comprise a first frequency band and the second resources comprise a second frequency band, and the first frequency band contains at least some of the same frequencies as the second frequency band.

4. The communication system of claim 1, wherein the first resources comprise a first frequency band and the second resources comprise a second frequency band, and the first frequency band contains none of the same frequencies as the second frequency band.

5. The communication system of claim 1, wherein a first power level used to communicate using the first resources is lower than a second power level used to communicate using the second resources.

6. The communication system of claim 5, wherein the first geographic region is increased in size and the second geographic region is decreased in size by increasing the first power level and/or decreasing the second power level.

7. The communication system of claim 5, wherein the first geographic region is decreased in size and the second geographic region is increased in size by decreasing the first power level and/or increasing the second power level.

8. The communication system of claim 1, wherein the second resources are at least partially distinct from the fourth resources, and the first resources at least partially overlap with the third resources.

9. The communication system of claim 8, wherein the fourth geographic region completely surrounds the third geographic region.

10. The communication system of claim 8, wherein the first resources comprise a first frequency band,
the second resources comprise a second frequency band,
the third resources comprise a third frequency band,
and the fourth resources comprise a fourth frequency band, and wherein:
the first frequency band contains none of the same frequencies as the second frequency band;
the third frequency band contains none of the same frequencies as the fourth frequency band; and
the second frequency band contains none of the same frequencies as the fourth frequency band.

11. A method comprising:
communicating a plurality of signals from a host unit to a first central remote unit, one or more first outer remote units, a second central remote unit, and one or more second outer remote units;
transmitting and receiving, by the first central remote unit, radio frequency (RF) communications using first resources over a first geographic region corresponding to a central portion of a first cell having a first geographic footprint;

transmitting and receiving, by the one or more first outer remote units, RF communications using second resources over a second geographic region corresponding to an outer portion of the first cell, wherein the first resources are at least partially distinct from the second resources;

transmitting and receiving, by the second central remote unit, RF communications using third resources over a third geographic region corresponding to a central portion of a second cell having a second geographic footprint; and transmitting and receiving, by the one or more second outer remote units, RF communications using fourth resources over a fourth geographic region corresponding to an outer portion of the second cell, wherein the third resources are at least partially distinct from the fourth resources, and a border of the first geographic footprint at least partially overlaps with a border of the second geographic footprint.

12. The method of claim 11, wherein the second geographic region completely surrounds the first geographic region.

13. The method of claim 11, wherein the first resources comprise a first frequency band and the second resources comprise a second frequency band, and the first frequency band contains at least some of the same frequencies as the second frequency band.

14. The method of claim 11, wherein the first resources comprise a first frequency band and the second resources comprise a second frequency band, and the first frequency band contains none of the same frequencies as the second frequency band.

15. The method of claim 11, wherein a first power level used to communicate using the first resources is lower than a second power level used to communicate using the second resources.

16. The method of claim 15, wherein the first geographic region is increased in size and the second geographic region is decreased in size by increasing the first power level and/or decreasing the second power level.

17. The method of claim 15, wherein the first geographic region is decreased in size and the second geographic region is increased in size by decreasing the first power level and/or increasing the second power level.

18. The method of claim 11, wherein the second resources are at least partially distinct from the fourth resources, and the first resources at least partially overlap with the third resources.

19. The method of claim 18, wherein the fourth geographic region completely surrounds the third geographic region.

20. The method of claim 18, wherein the first resources comprise a first frequency band, the second resources comprise a second frequency band, the third resources comprise a third frequency band, and the fourth resources comprise a fourth frequency band, and wherein:

the first frequency band contains none of the same frequencies as the second frequency band;

the third frequency band contains none of the same frequencies as the fourth frequency band; and the second frequency band contains none of the same frequencies as the fourth frequency band.

\* \* \* \* \*